United States Patent
Conzola et al.

(10) Patent No.: US 7,326,864 B2
(45) Date of Patent: Feb. 5, 2008

(54) METHOD AND APPARATUS FOR MASKING KEYSTROKE SOUNDS FROM COMPUTER KEYBOARDS

(75) Inventors: Vincent C. Conzola, Raleigh, NC (US); Vincent R. Lanzolla, Clayton, NC (US); Timothy A. Meserth, Durham, NC (US); Gerard F. Muenkel, Raleigh, NC (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/422,620

(22) Filed: Jun. 7, 2006

(65) Prior Publication Data

US 2007/0284235 A1   Dec. 13, 2007

(51) Int. Cl.
*H01H 9/00* (2006.01)
*H01H 13/70* (2006.01)

(52) U.S. Cl. .............. 200/5 A; 400/472; 400/490; 341/22; 345/168

(58) Field of Classification Search .......... 200/5 R, 200/5 A; 29/622; 341/20–22, 26, 27; 345/156, 345/168, 169, 173, 177, 178; 400/472–474, 400/477, 480, 481, 490–496
See application file for complete search history.

(56) References Cited

U.S. PATENT DOCUMENTS

| | | | |
|---|---|---|---|
| 4,599,607 A * | 7/1986 | Hill | 341/27 |
| 5,565,865 A * | 10/1996 | So | 341/20 |
| 5,748,888 A | 5/1998 | Angelo et al. | |
| 6,140,593 A * | 10/2000 | Bramesfeld et al. | 200/5 A |
| 6,218,966 B1 * | 4/2001 | Goodwin et al. | 341/27 |
| 6,236,339 B1 * | 5/2001 | Kamizono | 341/27 |
| 6,282,655 B1 | 8/2001 | Given | |
| 6,497,521 B1 * | 12/2002 | Lohr | 400/491 |
| 6,759,613 B2 * | 7/2004 | Kurihara | 200/314 |
| 7,030,323 B2 * | 4/2006 | Lahr | 200/5 A |
| 2005/0015614 A1 | 1/2005 | Gilfix et al. | |

* cited by examiner

*Primary Examiner*—Michael A Friedhofer
(74) *Attorney, Agent, or Firm*—Cantor Colburn LLP; Randall Bluestone

(57) ABSTRACT

Disclosed herein is a method of masking audible sounds emanating from a keyboard in response to a stroking of keys on the keyboard, the method comprising, selecting components from a plurality of components with various masses, building the keyboard with the selected components, moving a movable mass within the keyboard, and energizing a driving transducer within the keyboard. Further disclosed herein is a keyboard for a computer, comprising a plurality of keys, a cover with the keys protruding therethrough, a base supporting the cover and the keys, and at least one selectable mass wherein the mass is selected from a plurality of masses, a movable mass supported by the base and movable relative to the base, and a driving transducer supported by the base.

10 Claims, 5 Drawing Sheets

METHOD AND APPARATUS FOR MASKING KEYSTROKE SOUNDS FROM COMPUTER KEYBOARDS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer keyboards and particularly to the sounds emitted from a keyboard as keys of the keyboard are stroked.

2. Description of Background

Technology now exists that makes it possible to determine which keys are stroked on a computer keyboard by recording the sound that emanates from the keyboard as the keys are stroked and processing the recorded sound in a personal computer (PC).

Using input from an unsophisticated PC microphone and processing the input using standard machine learning and speech recognition techniques it is possible to recreate typed input with up to 96% accuracy. Using a two-phase process of training followed by recognition, researchers were able to successfully recreate both English and random (password) input from multiple keyboards, across various (quiet and noisy) environments. While techniques such as the one described are still relatively new, one can envision several nefarious uses for the technology. For example, a person using a parabolic microphone could sit in a public setting, such as a coffee shop with Internet access, and eavesdrop on other patrons; recording sensitive information keyed into their computers, such as passwords and credit card numbers.

Accordingly, there is a need in the art for methods and apparatuses that inhibit the detection of keystrokes by the sounds emanating during stroking of the keys.

SUMMARY OF THE INVENTION

The shortcomings of the prior art are overcome and additional advantages are provided through the provision of a method of masking audible sounds emanating from a keyboard in response to a stroking of keys on the keyboard, the method comprising, selecting components from a plurality of components with various masses, building the keyboard with the selected components, moving a movable mass within the keyboard, and energizing a driving transducer within the keyboard.

Further shortcomings of the prior art are overcome and additional advantages are provided through the provision of a keyboard for a computer, comprising a plurality of keys, a cover with the keys protruding therethrough, a base supporting the cover and the keys, and at least one selectable mass wherein the mass is selected from a plurality of masses, a movable mass supported by the base and movable relative to the base, and a driving transducer supported by the base.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

The technical effect of the disclosed embodiments is improved security when using a computer keyboard in a public setting. Specifically, the technical effect is to inhibit the deciphering of which key of a keyboard is stroked based on the sound that emanates from the keyboard as the key is stroked. Computer algorithms for noise cancellation are known in the audiophile industry and are applied to listening to music, for example, in an environment with a noisy background such as on an airplane. Application of similar techniques to attenuate the sounds that are projected from a computer keyboard during the stroking of keys on the keyboard is disclosed.

As a result of the summarized invention, a solution has been devised that permits a computer user to key in private information, such as passwords and credit card numbers, in a public setting while preventing keystroke detection based on the sounds emanating from the keys as they are depressed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
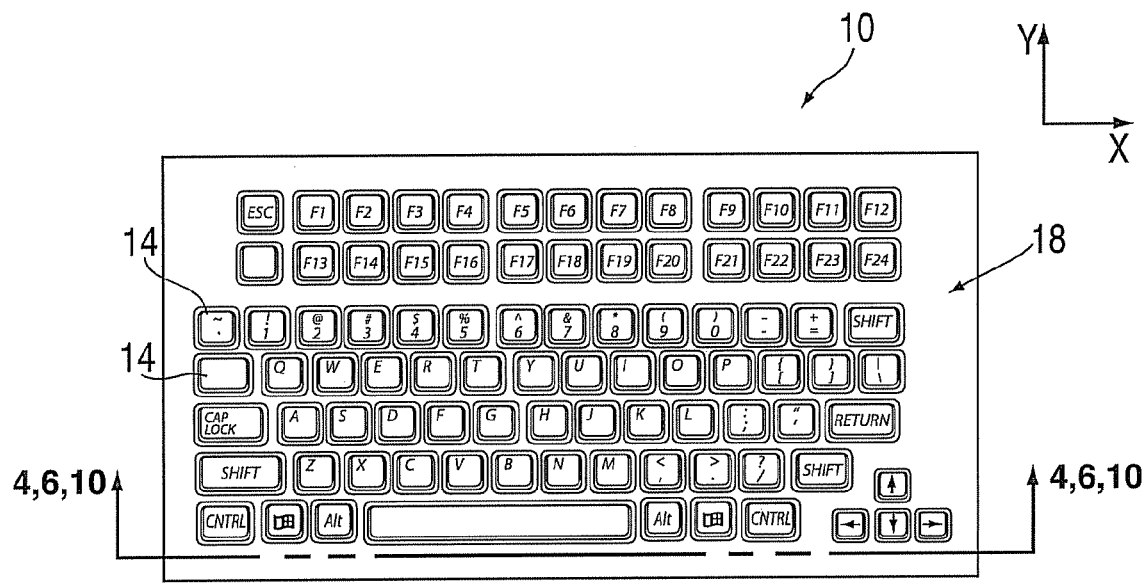
FIG. 1 illustrates one example of a plan view of a keyboard disclosed herein.
Figure 2:
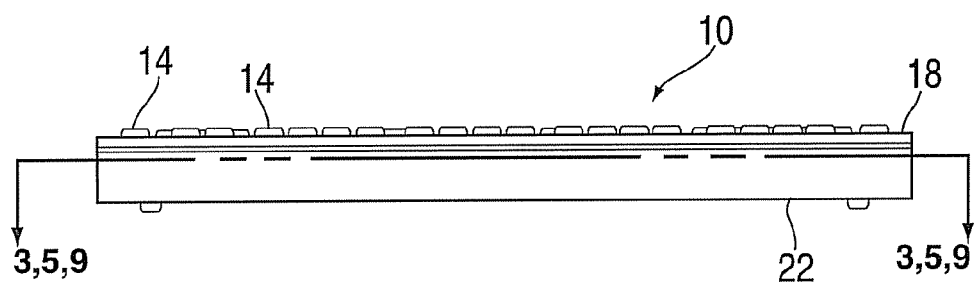
FIG. 2 illustrates one example of an edge view of the keyboard of FIG. 1.

Turning now to the drawings in greater detail, it will be seen that in FIGS. 1 and 2 there is a computer keyboard shown generally at 10 in accord with an embodiment of the invention. The keyboard 10 among other things includes; keys 14 that protrude through a cover 18 that is attached to and supported by a base 22. Each of the keys 14 is spring loaded in a direction away from the base 22 and can move in a direction towards the base 22 in response to being depressed by an operator. Upon release, by the operator, the spring loading returns the keys 14 to their original position.

Each key 14 has a unique X-Y coordinate position relative to the cover 18 and the base 22. Additionally, each key 14 also has a unique position relative to the other keys 14 on the keyboard 10. This positional uniqueness results in a unique audible sound being emitted for every key 14 when it is stroked. This is partially due to the flat shape and uniform thickness of the base 22, which forms a sounding board. Sound (pressure waves) generated from the depression of a key 14 impacts a specific location on the base 22 in accord with its coordinate position relative to the base 22. This position on the base being a unique position creates a unique response from the base 22. Disruption of the acoustic sounding board of the base 22 is easily achieved by the introduction of a mass to the keyboard 10.

Figure 3:
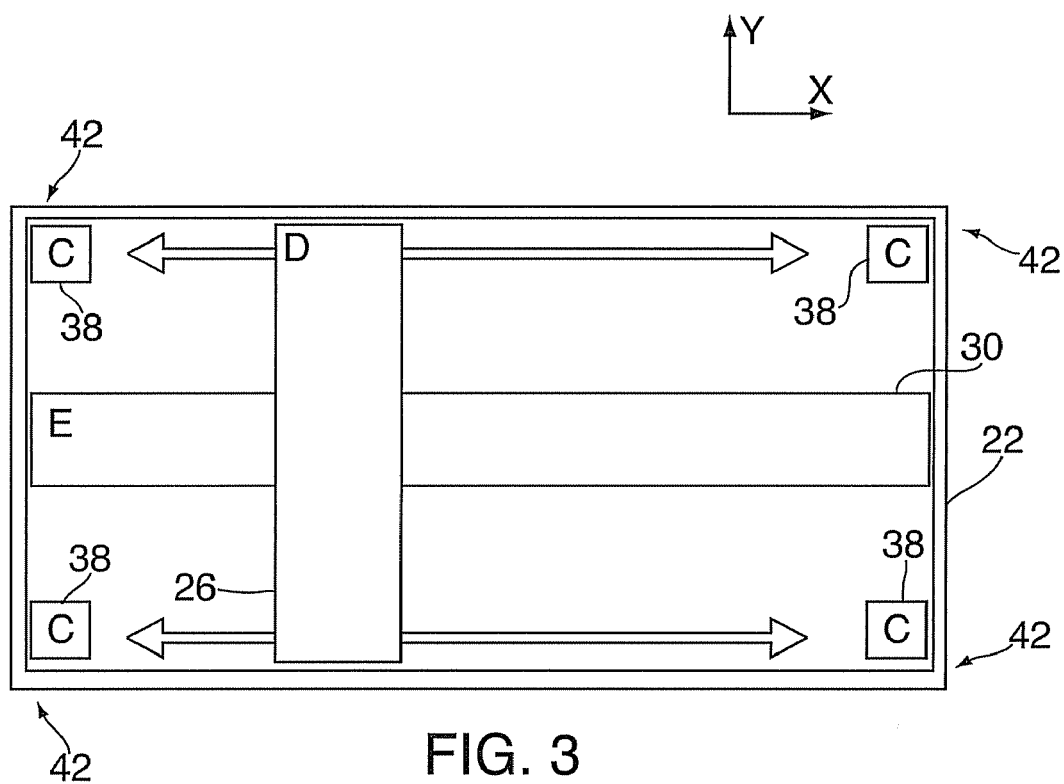
FIG. 3 illustrates one example of a cross sectional view of an embodiment of the keyboard in FIG. 2 taken at section line 3-3.
Figure 4:
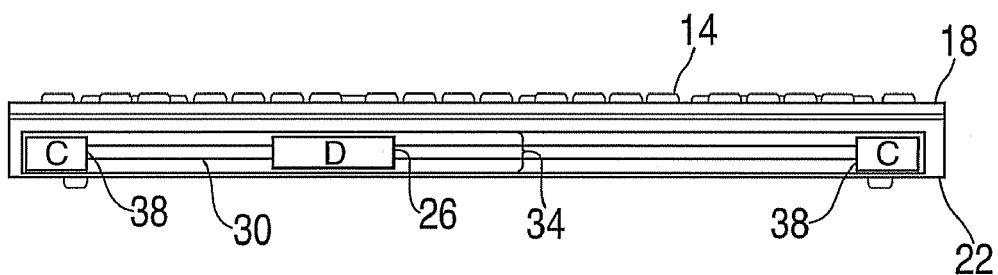
FIG. 4 illustrates one example of a cross sectional view of an embodiment of the keyboard of FIG. 1 taken at section line 4-4.

Referring to FIGS. 3 and 4, cross sectional views of the keyboard 10 of FIGS. 2 and 1, taken at arrows 3-3 and 4-4 respectively, are shown. A moveable mass 26 is able to move along slide 30 in the directions of plus X and minus X in a cavity 34 of the keyboard 10 between the keys 14 and the base 22. The cavity 34, by being located between the keys 14 and the base 22 may hide the mass 26 and its location from the operator as well as any other observer. The mass 26 may be formed of iron or other magnetic metal, for example, and may therefore be attracted to electromagnets 38 located near the four corners 42 of the keyboard 10. Energization of the electromagnets 38 may cause movement of the mass 26 along the slide 30. Movement of the mass 26 may result in a change to the acoustics of the keyboard 10 enough to alter the sound emitted by the keyboard 10 when any specific key 14 is stroked to prevent detection by analysis of the sound emitted.

Energization of the electromagnets 38 may be controlled by a variety of inputs. For example, a random number generator could be used in response to each keystroke resulting in a random direction and random distance of movement of the mass 26. Alternately, a predefined movement of the mass 26 could occur regardless of which key is stroked. The electrical power that energizes the electromagnets 38 could be supplied from whatever source the PC is receiving power, for example, a battery or from an AC power source.

Alternatively, the mass 26 could be moved through a mechanical linkage to the keys 14 rather than using the electromagnets 38. Such a system could use linkages (not shown) to move the mass 26 in a plus X or a minus X direction, for example, from its current location in response to the stroking of the keys 14. Additionally, the mass 26 could be moved in a plus Y and minus Y direction with any applicable method while not deviating from embodiments of the present invention.

Figure 5:
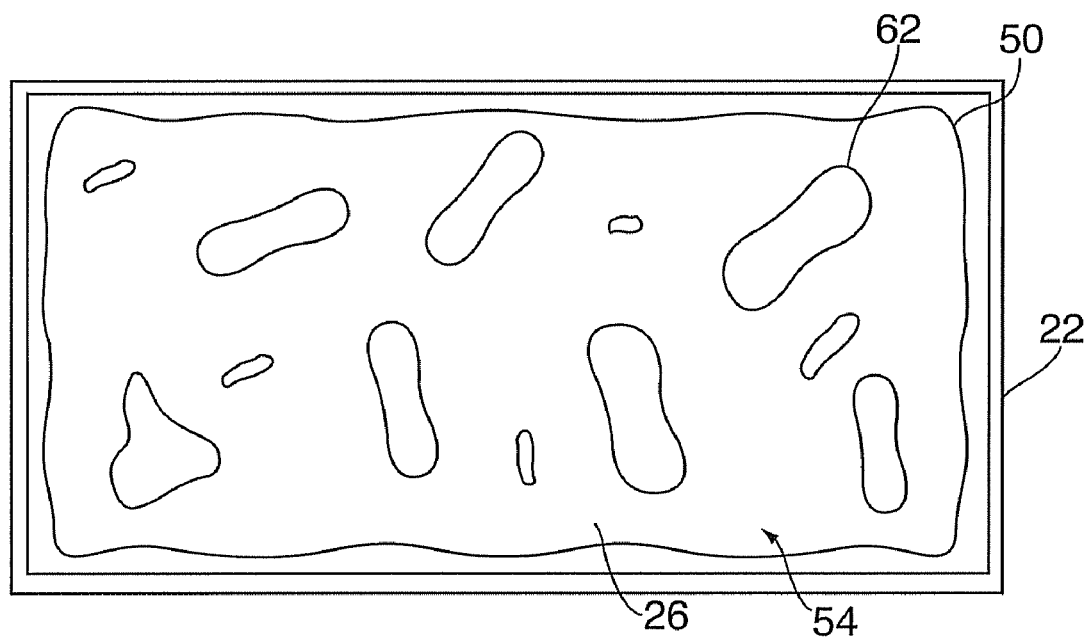
FIG. 5 illustrates one example of a cross sectional view of an embodiment of the keyboard in FIG. 2 taken at section line 5-5.
Figure 6:
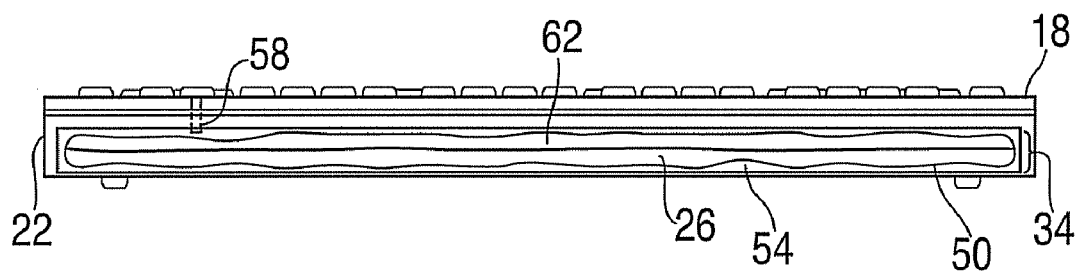
FIG. 6 illustrates one example of a cross sectional view of an embodiment of the keyboard of FIG. 1 taken at section line 6-6.

Referring now to FIGS. 5 and 6, cross sectional views of the keyboard 10 of FIGS. 2 and 1, taken at arrows 5-5 and 6-6 respectively, are shown. Similar to the embodiment of FIGS. 3 and 4, FIGS. 5 and 6 use the redistribution of mass within cavity 34, formed between the keys 14 and the base 22, to disrupt the sound that emanates from the keyboard 10 when keys 14 are stroked. In embodiments disclosed in FIGS. 5 and 6, the movement of mass 26 is carried out by locally deforming a bag 50 that is partially filled with a fluid 54, herein depicted as a liquid. The deformation occurs when protrusions 58, from the keys 14, push on the surface of the bag 50 thereby forming a local depression in the bag 50. Gas pockets 62, within the bag 50, redistribute themselves as the buoyancy force acting on the gas pockets 62 push the gas pockets 62 to higher elevations. Consequently, locations of the gas pockets 62, within the bag 50, changes with every keystroke causing a randomization of the location of the mass 26, which is the fluid 54, to occur. Additionally, the attitude and movement of the keyboard 10 itself will cause the fluid 54 to move within the bag 50, thereby adding to the randomness of the mass 26 distribution.

Alternate embodiments may employ a cavity 34 that contains the fluid 54 in such a way that it is sealed without the use of a bag 50. Such an embodiment may decrease the force required to depress the key 14 during a keystroke since no bag 50 would be undergoing deformation.

Figure 7:
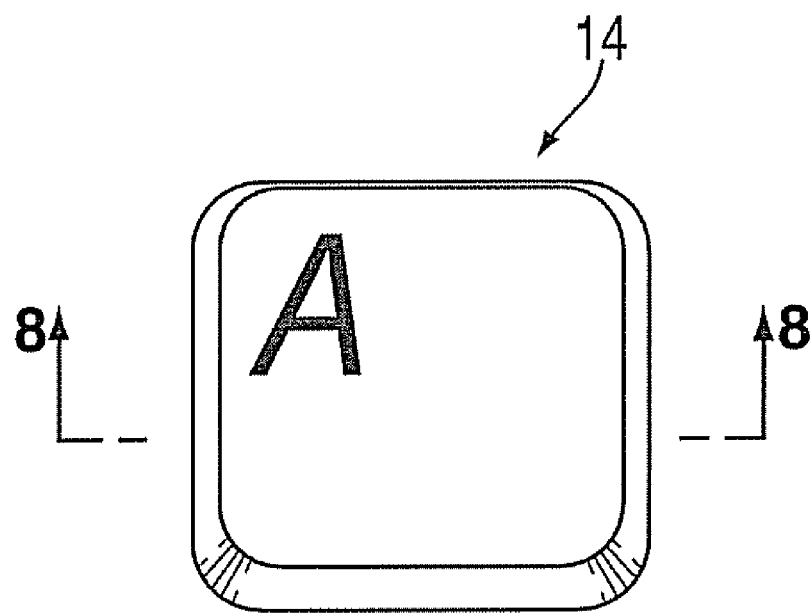
FIG. 7 illustrates one example of a plan view of a key of the keyboard of FIG. 1.
Figure 8:
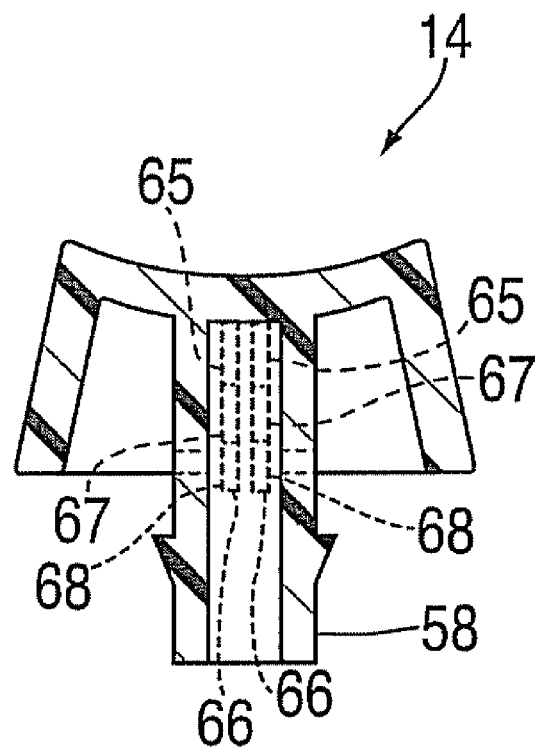
FIG. 8 illustrates one example of a cross sectional view of the key of FIG. 7 taken at section line 8-8.

Referring to FIGS. 7 and 8, the keys 14 include a protrusion 58 that extends from the underside of the keys 14 and engages the bag 50, for example, in the cavity 34, as described above. Many of the keys 14 have the same shape as one another and are made from the same plastic material and are therefore injection molded in the same mold. The character may be subsequently printed thereon. An embodiment of the invention shown in FIGS. 7 and 8 includes provisions for molding optional ribs 66 on the underside of the keys 14. Molds can be inserted to facilitate easy changeover between various rib configurations. The optional ribs 66 can be of various lengths and widths to afford the keys 14 a wide variety of different masses. A short rib 65, a longer rib 67 and even longer rib 68 are shown in phantom as possible variations. The keys 14 with various rib lengths and associated masses may be mixed together prior to character printing to increase the randomness of the mass that each character key 14 will have. Each different key mass may alter the sound that is emitted by the keyboard 10 when each key 14 is depressed, thereby creating a very large number of permutations of sounds that may emanate from any specific keyboard 10. The larger the number of total sounds that may emanate from a keyboard 10, the more the characteristics of the sounds from different keystrokes will overlap creating greater difficulty in determining which key 14 caused each sound. Such overlapping of keystroke sounds may render which key 14 was the source of which sound undeterminable. The foregoing embodiment discloses keyboards 10 made from selectable masses, disclosed herein as keys 14, although, it should be noted that other components within the keyboard could be selectable as well with varying masses to create a variety of different possible keyboard mass combinations.

Figure 9:
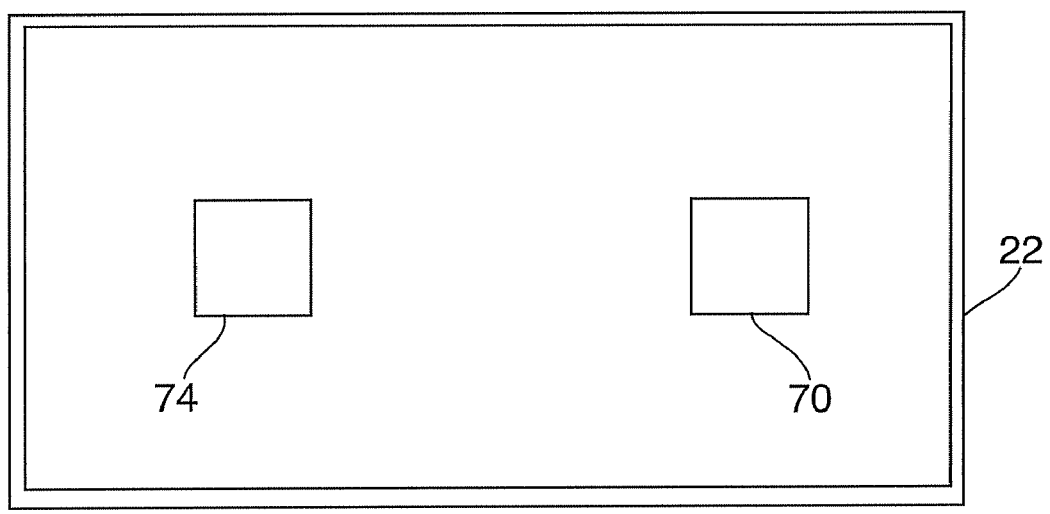
FIG. 9 illustrates one example of a cross section view of an embodiment of the keyboard in FIG. 2 taken at section line 9-9.
Figure 10:
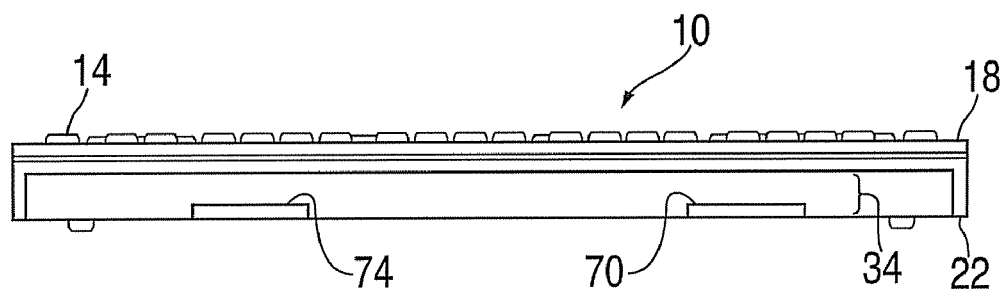
FIG. 10 illustrates one example of a cross sectional view of an embodiment of the keyboard of FIG. 1 taken at section line 10-10.

The foregoing embodiment, which relies on the different masses of keys 14 to thwart the determination of keystrokes, is a passive approach, while an embodiment of FIGS. 9 and 10, relies on an active approach. Referring now to FIGS. 9 and 10, cross sectional views of the keyboard 10 of FIGS. 2 and 1, taken at arrows 9-9 and 10-10 respectively, are shown. Specifically, the keyboard 10, among other things includes; a receiving transducer 70, such as an accelerometer microphone or other device for converting vibrational or acoustical energy into electrical energy, located within the cavity 34 of the keyboard 10 that lays between the keys 14 and the base 22. The receiving transducer 70 senses the vibrations of the keyboard 10 that result from each stroke of a key 14. The signal from the receiving transducer 70 is then processed, by a processor (not shown) and a response signal is sent to a driving transducer 74 such as a piezoelectric transducer, an audio speaker or other device for converting electrical energy into mechanical energy, also located within the cavity 34. The response signal may be 180 degrees out of phase with the signal sensed by the receiving transducer 70 such that the waves generated by the driving transducer 74 cancel waves from the stroking of keys 14 thereby attenuating the magnitude of the emanating sounds. Stated another way, the driving transducer 74, by generating waves that are 180 degrees out of phase with the receiving waves, will create sound pressure waves that destructively interfere and, in effect, cancel the receiving sound pressure wave.

An alternate embodiment may utilize the input from the receiving transducer 70 to time the sending of a random noise signal to the driving transducer 74. Such a system may transmit a random noise, or white noise, instead of an out of phase noise to cover the sounds made by the keystrokes, thereby making detection of a clean keystroke sound difficult. Still other embodiments may not utilize the receiving transducer 70 or a speaker to detect the sound emanating from a stroked key 14 at all, but instead rely on the electrical signal generated by the keystrokes themselves to determine the timing of when to energize the driving transducer 74.

Embodiments of the invention may include some of the following advantages: attenuation of sound emanating from a keyboard, masking of sounds emanating from a keyboard, increased variations of sounds emanating from a keyboard, alteration of sounds emanating from a keyboard, continuously randomly modifying sounds emanating from a keyboard and changing, over time, the sound emanating from a keyboard in response to a given key being stroked.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of masking audible sounds emanating from a keyboard in response to a stroking of keys on the keyboard, the method comprising:
   selecting components from a plurality of components with various masses;
   building the keyboard with the selected components;
   moving a movable mass within the keyboard; and
   energizing a driving transducer within the keyboard.

2. The method of claim 1, wherein the movement of the movable mass is by magnetic force.

3. The method of claim 1, wherein the movement of the movable mass is varied based on which keys are stroked.

4. The method of claim 1, wherein the movement of the movable mass is random.

5. The method of claim 1, wherein the movable mass is a liquid.

6. The method of claim 1, wherein the selecting is done at random.

7. The method of claim 1, wherein the components selected are keys.

8. The method of claim 1, wherein the timing of the energization of the transducer coincides with the stroking of keys.

9. The method of claim 8, wherein the energization of the transducer varies depending upon the sound emanating from the keystrokes.

10. The method of claim 8, wherein the energization of the transducer cancels sounds emanating from the keystrokes.

* * * * *